United States Patent [19]

Linse-Loefgren

[11] Patent Number: 4,847,107
[45] Date of Patent: Jul. 11, 1989

[54] PREPARATION OF FOOD PRODUCT

[75] Inventor: Anna M. Linse-Loefgren, Klippan, Sweden

[73] Assignee: Nestec S.A., Vevey, Switzerland

[21] Appl. No.: 61,789

[22] Filed: Jun. 11, 1987

[30] Foreign Application Priority Data

Jul. 1, 1986 [EP] European Pat. Off. ........ 86108917.5

[51] Int. Cl.$^4$ ...................... A23C 19/09; A21D 13/08
[52] U.S. Cl. .................................... 426/582; 426/289; 426/549; 426/552; 426/555; 426/653
[58] Field of Search ............... 426/582, 289, 549, 653, 426/552, 555

[56] References Cited

U.S. PATENT DOCUMENTS

| 1,737,770 | 12/1929 | Parsons | 426/582 |
| 2,279,202 | 4/1942 | Musher | 426/582 |
| 2,576,597 | 11/1951 | Gootgeld | 426/582 |
| 3,184,318 | 5/1965 | McCadam | 426/582 |
| 3,694,231 | 9/1972 | Izzo et al. | 426/518 |
| 4,032,669 | 6/1977 | Peters et al. | 426/582 |

OTHER PUBLICATIONS

Women's Day Encyclopedia of Cookery, 1966, Editor: E. Tighe, Fawcett Publications, Inc., N.W., p. 362.

Primary Examiner—Donald E. Czaja
Assistant Examiner—Helen Pratt
Attorney, Agent, or Firm—Vogt & O'Donnell

[57] ABSTRACT

Fresh cheese is milled, the milled cheese is cooled to a temperature of from below 0° C. to −50° C., starch is added to and mixed with the cooled cheese, and then the cooled mixture is disintegrated into finely divided pieces. The finely divided pieces may be incorporated into a dry batter mix.

10 Claims, No Drawings

PREPARATION OF FOOD PRODUCT

BACKGROUND OF THE INVENTION

The present invention relates to a method of preparing fresh cheese in finely divided particulate form.

There are several circumstances where it is desirable to have fresh cheese in a free-flowing, fine, particulate form, for instance, for incorporation into batter. However, it is not easy to obtain fresh cheese in the form of small particles which do not stick together while retaining the desirable natural cheese flavour, aroma, melting and colour characteristics. For example U.S. Pat. No. 3,694,231 describes a method which involves reducing the temperature of the cheese to at least −150° C. and then drying in a fluidised air bed having an air temperature between about 16° C. and 24° C. Such a process is complex, costly and time-consuming.

SUMMARY OF THE INVENTION

I have, surprisingly, found that fresh cheese in a finely divided particulate form can be produced by a very simple process which does not require such drastic cooling.

Accordingly, the present invention provides a process for preparing fresh cheese in a finely divided particulate form which comprises milling or dicing fresh cheese, cooling to a temperature from below 0° C. to −50° C. and disintegrating in a bowl chopper in the presence of starch.

DESCRIPTION OF PREFERRED EMBODIMENTS

The process of this invention is particularly suitable for cheese having a consistency varying from medium to hard.

The milling or dicing of the cheese may be carried out in the same way as the milling of meat, for example, simply by passing the cheese through a mill. Suitable types of mill are, for instance, a COMITROL mill by Urschel. The milling or dicing is conveniently carried out at ambient temperature and reduces the size of the cheese into pieces which enable it to be introduced into a bowl chopper, e.g., having an average diameter of from 6 to 15 mm.

After milling, the cheese may be cooled by conventional means, for instance a plate freezer, preferably to a temperature from −10° C. to −30° C. and especially from −15° C. to −25° C.

The type of starch used is not critical and may be, for instance, wheat, corn, rice, maize or potato starch. The amount of starch used should be at least sufficient to substantially prevent the particles of cheese from sticking together and is conveniently from 10 to 40 parts and preferably from 20 to 30 parts by weight per 100 parts by weight of cheese. The amount of starch required to substantially prevent the particles of cheese from sticking together is usually less for a dry cheese than for a moist cheese.

The frozen milled cheese pieces are then transferred to a bowl chopper and disintegrated in the presence of starch to reduce the particle size to an average diameter of from 0.5 mm to 5 mm and preferably from 1 to 3 mm. This finely divided cheese may be kept in cold storage if it is to be used within a few hours but otherwise it should be stored in the frozen state.

The finely divided particulate cheese obtained by the process of the present invention is especially suitable for incorporation into a batter mix, for example, Tempura batter mix. Advantageously, the amount of the finely divided cheese present in the dry batter mix is from 40% to 80% and preferably from 50% to 70% by weight based on the total weight of the composition. The finely divided cheese is conveniently blended by conventional methods with the other ingredients of the dry batter mix at a temperature below 0° C.

The present invention also provides a composition comprising a dry batter mix, for example, Tempura batter mix, and a finely divided particulate cheese prepared by milling fresh cheese, cooling to a temperature from below 0° C. to −50° C. and disintegrating in a bowl chopper in the presence of starch.

The amount of the finely divided particulate cheese in the composition is advantageously from 40% to 80% and preferably from 50% to 70% by weight based on the total weight of the composition.

Such a batter composition containing the finely divided particulate cheese may be used for the preparation of products such as cheese pancakes.

The following Examples further illustrate the present invention. Parts are given by weight.

EXAMPLES

Example 1

100 parts of fresh cheddar cheese were milled by passing through a machine suitable for milling meat at ambient temperature to give pieces with an average diameter of 10 mm. The milled cheese was then cooled to −20° C. in a plate freezer and 25 parts of potato starch were added. The mixture of milled cheese and potato starch were disintegrated in a bowl chopper at −20° C. to give a free flowing finely divided particulate cheese having an average diameter of 2 mm.

Example 2

A dry batter mix was prepared by blending the following ingredients:
Wheat flour, 30.185 parts
White pepper, 0.190 parts
Salt, 2.125 parts
Monosodium glutamate, 2.400 parts
Baking powder, 2.500 parts 50 parts of fresh cheddar cheese were milled by passing through a Comitrol mill by Urschel at ambient temperature to give pieces with an average diameter of 8 mm. The milled cheese was then cooled to −20° C. in a plate freezer and mixed with 6.3 parts of potato starch and 6.3 parts of corn starch. This mixture was then disintegrated in a bowl chopper at −20° C. to give a free flowing finely divided particulate cheese having an average diameter of 2 mm.

The dry batter mix and the finely divided particulate cheese were then blended at −10° C.

I claim:

1. A process for preparing a dry batter mix including cheese in a finely divided particulate form comprising milling fresh cheese into particulate form, cooling the milled cheese to a temperature of from below 0° C. to −50° C., mixing starch with the cooled cheese in an amount sufficient for substantially preventing pieces of the cooled cheese from sticking together, then disintegrating the cooled mixture into finely divided pieces and then combining the disintegrated pieces with a dry batter mix at a temperature below 0° C.

2. A process according to claim 1 wherein the dry batter mix is a Tempura batter mix.

3. A process according to claim 1 wherein prior to combining the pieces with the batter mix, the pieces are stored in a frozen state.

4. A process according to claim 1 wherein the milled cheese has an average diameter of from 6 mm to 15 mm, the starch is mixed with the cooled cheese in an amount of from 10 parts to 40 parts by weight per 100 parts by weight of the cooled cheese and the disintegrated pieces have an average diameter of from 0.5 mm to 5 mm.

5. A process according to claim 1 wherein the milled cheese is cooled to a temperature of from −10° C. to −30° C.

6. A process according to claim 4 wherein the milled cheese is cooled to a temperature of from −10° C. to −30° C.

7. The product of the process of claim 1.

8. The product of the process of claim 4.

9. The product of claim 7 wherein the disintegrated pieces are combined with the batter mix in an amount of from 40% to 80% by weight based upon the weight of the product.

10. The product of claim 8 wherein the disintegrated pieces are combined with the batter mix in an amount of from 40% to 80% by weight based upon the weight of the product.

* * * * *